(12) United States Patent
Strasser

(10) Patent No.: US 7,031,031 B1
(45) Date of Patent: Apr. 18, 2006

(54) POSITION MEASURING SYSTEM

(75) Inventor: Erich Strasser, Trostberg (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 846 days.

(21) Appl. No.: 10/008,371

(22) Filed: Dec. 6, 2001

(30) Foreign Application Priority Data

Dec. 6, 2000 (DE) ................................. 100 60 572
Feb. 1, 2001 (DE) ................................. 101 04 373

(51) Int. Cl.
*H04N 7/04* (2006.01)

(52) U.S. Cl. .................... 358/474; 358/1.2; 250/231.1; 256/498

(58) Field of Classification Search ................ 358/474, 358/505, 1.2, 1.5, 504, 525, 488, 486; 250/231.31; 356/498, 616
See application file for complete search history.

(56) References Cited

U.S. PATENT DOCUMENTS

| | | | |
|---|---|---|---|
| 3,725,904 A * | 4/1973 | Breslow et al. ................. 341/9 |
| 4,311,987 A * | 1/1982 | Taillebois ....................... 341/3 |
| 5,615,109 A | 3/1997 | Eder ........................... 395/208 |
| 5,687,103 A | 11/1997 | Hagl et al. |
| 5,793,201 A | 8/1998 | Nelle et al. |
| 5,987,425 A | 11/1999 | Hartman et al. ............... 705/20 |
| 6,101,479 A | 8/2000 | Shaw ............................. 705/8 |
| 6,265,992 B1 * | 7/2001 | Hagl et al. .................... 341/11 |
| 2005/0077457 A1 * | 4/2005 | Hofer .................... 250/231.13 |
| 2005/0080559 A1 * | 4/2005 | Ishibashi et al. ............ 701/213 |

FOREIGN PATENT DOCUMENTS

| | | |
|---|---|---|
| DE | 28 25 842 | 12/1978 |
| DE | 35 09 682 | 9/1986 |
| DE | 40 09 749 | 12/1990 |
| DE | 43 42 377 | 6/1995 |
| DE | 44 25 416 | 2/1996 |
| DE | 44 27 278 | 2/1996 |
| DE | 195 08 834 | 9/1996 |
| EP | 1035485 | 9/2000 |
| WO | 9909503 | 2/1999 |
| WO | 0039718 | 7/2000 |

OTHER PUBLICATIONS

InformationWEEK, Sep. 1996, Johnston, S.J., No. 596 "How to Get a Better Return on Data", pp. 82, 86, 88.

(Continued)

*Primary Examiner*—Kimberly Williams
*Assistant Examiner*—Negussie Worku
(74) *Attorney, Agent, or Firm*—Brinks Hofer Gilson & Lione

(57) ABSTRACT

A method for the functional control of a position measuring system that includes placing a scanning unit at a position with respect to a graduation, generating a first scanning signal and a second scanning signal during the displacing, forming a first measured position value, P1, in accordance with a first linkage rule that involves the first scanning signal and the second scanning signal and forming a second measured position value, P2, in accordance with a second linkage rule that involves the first scanning signal and the second scanning signal, wherein the first linkage rule differs from the second linkage rule. Comparing the first measured position value, P1, with the second measured position value, P2, and generating an error signal as a result of the comparing.

12 Claims, 2 Drawing Sheets

OTHER PUBLICATIONS

Banking Technology, Oct. 1991, vol. 8, No. 9, Austin, D., "Brave New Branches", pp. 49-51.

Banking Software Review, Autumn 1990, vol. 15, No. 4, Rosenthal B. E., "Turning Products into Profits with Teller Tools", pp. 54-59.

Bank Systems and Equipment, Jun. 1988, vol. 25, No. 6, Fuentebelle, C., "Teller and Platform Integration Expands Marketing Drive", pp. 65-68.

Bank Systems and Equipment, Jun. 1987, vol. 24, No. 6 "First Tennessee Turns to Integrated Packages", pp. 62-64.

Bank Systems and Equipment, Oct. 1986, vol. 23, No. 10, Caradonna, L., "Householding of Customer Files Yields Valuable Marketing Info", pp. 68-70.

Proceedings KDD-2000, Sixth ACM SIGKDD International Conference on Knowledge Discovery and Data Mining, Kitts, B.; Freed, D.; Vrieze, M.; "Cross-sell: a Fast Promotion-Tunable Customer-Item Recommendation Method Based on Conditionally Independent Probabilities", pp. 437-446.

* cited by examiner

POSITION MEASURING SYSTEM

Applicant claims, under 35 U.S.C. § 119, the benefit of priority of the filing date of Dec. 6, 2000 of a German patent application, copy attached, Ser. No. 100 60 572.9, filed on the aforementioned date, the entire contents of which is incorporated herein by reference. Applicant also claims, under 35 U.S.C. § 119, the benefit of priority of the filing date of Feb. 1, 2001 of a German patent application, copy attached, Ser. No. 101 04 373.2, filed on the aforementioned date, the entire contents of which is incorporated herein by reference.

BACKGROUND OF THE INVENTION

1. Field of the Invention

The present invention relates to a method for the function control of a position measuring system with a scanning unit, which can be displaced with respect to a graduation, wherein the scanning unit has several detector elements and generates several scanning signals at an instantaneous relative position between the graduation and the scanning unit. The present invention also relates to a position measuring system for executing the method.

2. Discussion of Related Art

Position measuring systems in the form of angle and linear measuring devices are widely employed in the machine tool industry and in other manufacturing, manipulation and testing systems. A high degree of functional dependability increases in importance in all types of usage, since faulty operations can cause considerable damage. There have already been several suggestions for a solution by obtaining a timely error indication through monitoring tests and in this way to prevent resulting damage.

A method, as well as a device for monitoring the correctness of the detected measured position value is described in U.S. Pat. No. 3,725,904, the entire contents of which are incorporated herein by reference, DE 28 25 842 C2 and corresponding U.S. Pat. No. 4,311,987, the entire contents of which are incorporated herein by reference. Two scanning units, which are arranged offset from each other by a predetermined distance, are provided for scanning a coding, or a graduation. The two measured position values of the two scanning units are compared to each other and a position difference is formed. This measured difference is compared with a nominal difference, predetermined by the geometric arrangement of the scanning units, and an error signal is issued as a function of the result of the comparison.

This step has the disadvantage that a redundant scanning unit is required, which increases the structural size and the output for structural elements.

Only one scanning unit is required with the position measuring device in accordance with DE 40 09 749 A1. For performing the test procedure, the scanning unit is displaced over a distance fixed by stops, and the distance measured in this way is compared with the distance defined by the stops. An error signal is generated when there is a deviation.

The disadvantage of this step lies in the provision of mechanical stops and the provision of an additional drive mechanism, which considerably increase the structural size.

OBJECTS AND SUMMARY OF THE INVENTION

It is therefore an object of the present invention to disclose a method for the functional control of a position measuring system which can be simply performed and which does not, or only negligibly, increase the structural size of the position measuring device.

This object is attained by a method for the functional control of a position measuring system that includes placing a scanning unit at a position with respect to a graduation, generating a first scanning signal and a second scanning signal during the displacing, forming a first measured position value, P1, in accordance with a first linkage rule that involves the first scanning signal and the second scanning signal and forming a second measured position value, P2, in accordance with a second linkage rule that involves the first scanning signal and the second scanning signal, wherein the first linkage rule differs from the second linkage rule. Comparing the first measured position value, P1, with the second measured position value, P2, and generating an error signal as a result of the comparing.

It is a further object of the present invention to disclose a position measuring system for executing the method.

This object is attained by a position measuring system that includes a graduation and a scanning unit that is positioned with respect to the graduation, wherein the scanning unit includes a detector system that generates a first scanning signal and a second scanning signal at an instantaneous relative position between the graduation and the scanning unit. An evaluation unit receives the scanning signal and forms a first measured position value, P1, based on the first scanning signal and the second scanning signal in accordance with a first linkage rule and a second measured position value, P2, based on the first scanning signal and the second scanning signal in accordance with a second linkage rule, wherein the first linkage rule differs from the second linkage rule. A comparator device receives the first and second measured position values, P1, P2, so as to generate an error signal as a function of the comparator comparing the first and second measured position values, P1, P2.

It is possible by the method in accordance with the present invention to detect in a simple way a malfunction of the detector elements of the scanning unit, as well as malfunctions of the electrical components in the individual scanning channels, in particular the amplifier and the trigger.

Further advantages, as well as details of the present invention, ensue from the following description of a preferred embodiment represented in the drawings.

DETAILED DESCRIPTION OF THE PREFERRED EMBODIMENTS

Figure 1A:
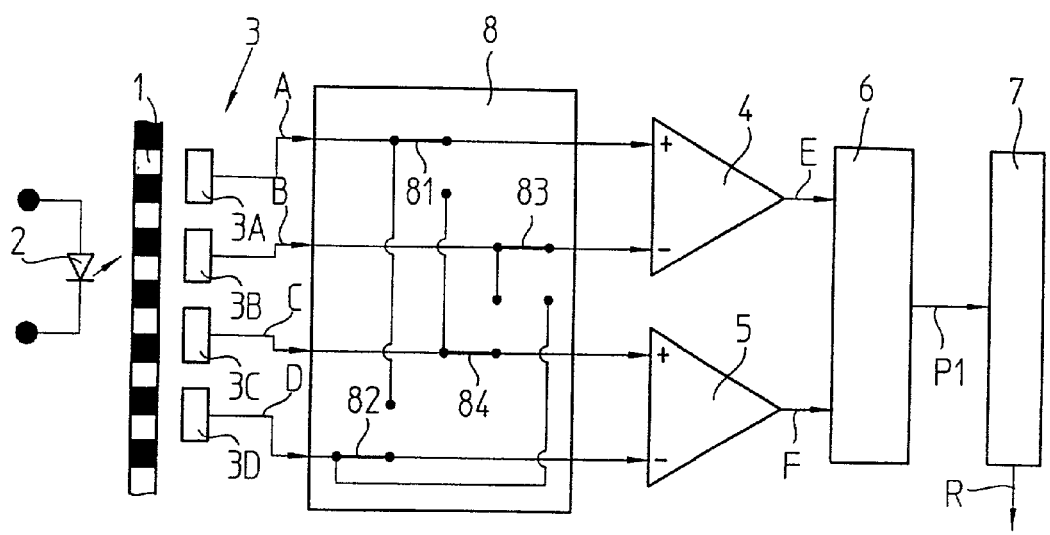
FIG. 1a shows a first exemplary embodiment of a position measuring system in a first control state according to the present invention.
Figure 1B:
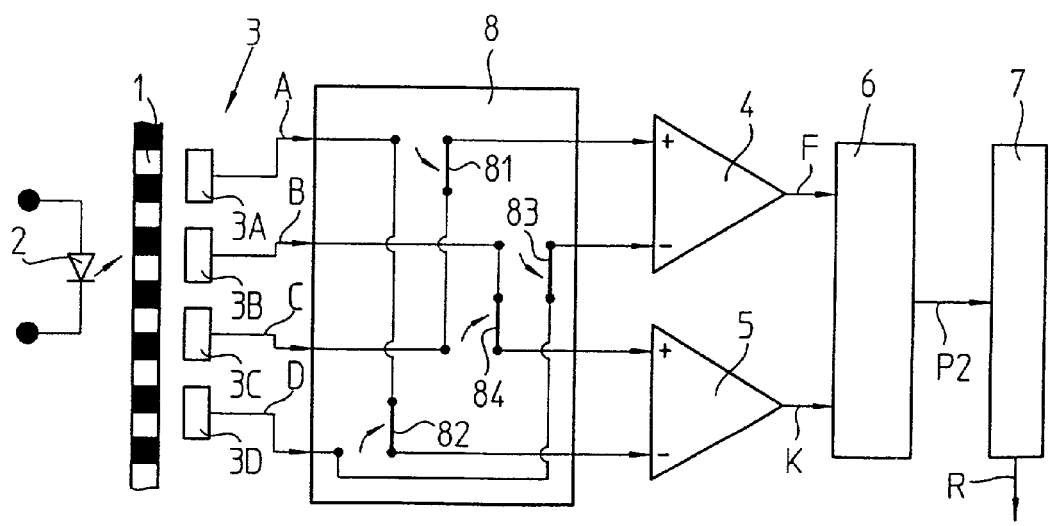
FIG. 1b shows the position measuring system in FIG. 1a in a second control state.

A first exemplary embodiment of the present invention is represented in FIGS. 1a and 1b. The position measuring system includes a photoelectrically scannable graduation 1, which is illuminated by light generated by a light source 2. The graduation 1 is scanned by a scanning unit 3 that is displaced relative to the graduation 1. During its displacement, the scanning unit 3 generates position-dependent electrical scanning signals A, B, C, D. The graduation 1 has an incremental, i.e. a periodic, marking so that the light emitted by the light source 2 impinges, periodically modulated, on a detector system that includes detector elements 3A, 3B, 3C, 3D of the scanning unit 3, which are arranged offset with respect to each other, and analog sinusoidal scanning signals A=a+sin α, B=a−sin α, C=a+cos α, D=a−cos α are generated, wherein a is a d.c. component and α is an angular value that ranges from 0° to 360° and is proportional to the instantaneous position within a graduation period of the incremental graduation. The periodic scanning signals A, B, C, D are each offset by 90° with respect to each other in a known manner, with the phase location being A=0°, B=180°, C=90°, D=270°. The periodic scanning signals A, B, C and D are generated at an instantaneous relative position between the graduation 1 and the scanning unit 3.

To eliminate the d.c. component a, the counter-phased scanning signals A, B and C, D are combined in accordance with linkage rules described below. In particular, scanning signals A, B and C, D are each differentially connected, for which purpose differential amplifiers are provided, at whose output lie the differential resultant signals E=A−B=2 sin α, and F=C−D=2 cos α. These differential signals E and F are supplied to an evaluation unit in the form of an interpolation unit 6 which, from the phase position of the differential signals E, F, forms an absolute measured position value P1 within a period of the periodic differential signals E, F in a known manner and stores it in a comparator device 7. This operation of the position measuring system is represented in FIG. 1.

The absolute measured position value P1 is calculated in the interpolation unit 6, for example in accordance with a linkage rule defined by the equation P1=arctan E/F. However, interpolation can also take place by reading out tabular values.

A switch-over device 8 is provided for the function control of the position measuring system, which applies the scanning signals A, B, C, D to the interpolation unit 6 in a different linkage. This state is represented in FIG. 1b. The scanning signals A, B, C, D are applied to different inputs of the differential amplifiers 4, 5 by the switches 81, 82, 83, 84, so that the differential resultant signal F=C−D is formed by the differential amplifier 4, and the differential resultant signal K=B−A by the differential amplifier 5. The interpolation unit 6 forms a second absolute measured position value P2 within a period of the periodic differential signals F, K in accordance with a different linkage rule defined by the equation P2=arctan F/K. Thus, this second measured position value P2 is a synthetically generated measured position value P2, so to speak, which is generated in accordance with a linkage rule of the scanning signals A, B, C, D, which differs from the actual measuring operation in accordance with FIG. 1a. This measured position value P2 is also supplied to the comparator device 7 and is stored there.

Both measured position values P1 and P2 are compared with each other in the comparator device 7 and are changed for a nominal distance. Under correct operating conditions, in the explained example P2=P1−T/4, with T=the signal period of the differential signals E, F, K. If, for example, a signal period (360°) is divided into 256 equal parts (interpolation factor=256), the comparison P2=P1−64 must result if all components which contribute to the generation of the scanning signals A, B, C, D, as well as E, F, K, operate error-free. If the result of this comparison does not lie within a predetermined tolerance range, an error signal R is issued.

The advantage of the present invention lies in that it is possible to perform a function control in a stopped state, i.e. without a relative movement between the graduation 1 and the scanning unit 3. All components of the individual scanning channels for generating the individual scanning signals A, B, C, D, E, F, K, as well as the interpolation unit 6, are included in the function control.

Figure 2A:
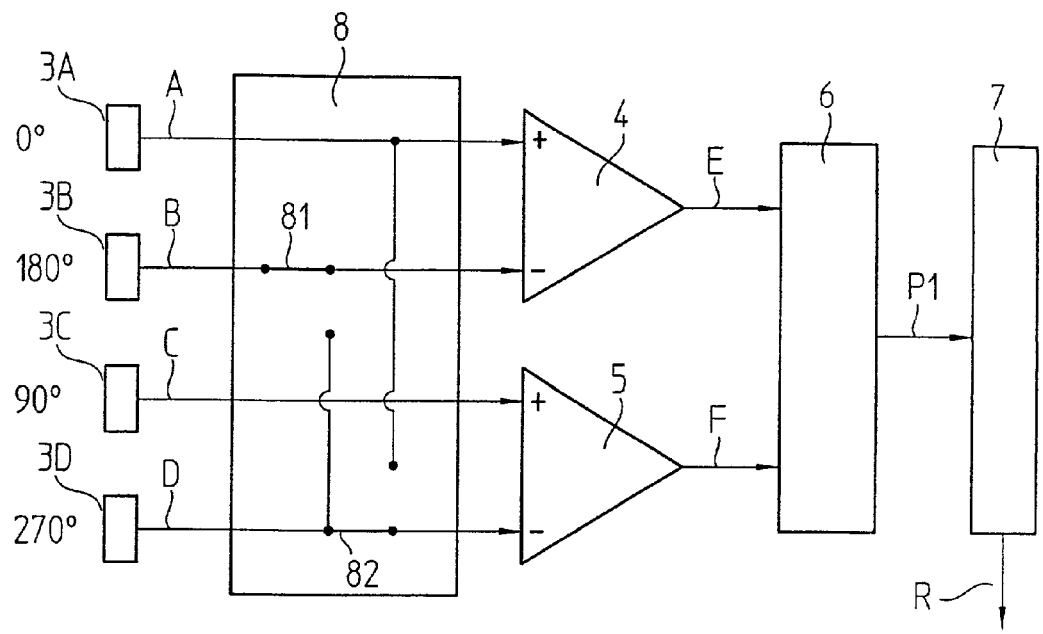
FIG. 2a shows a second embodiment of a position measuring system in a first control state according to the present invention.
Figure 2B:
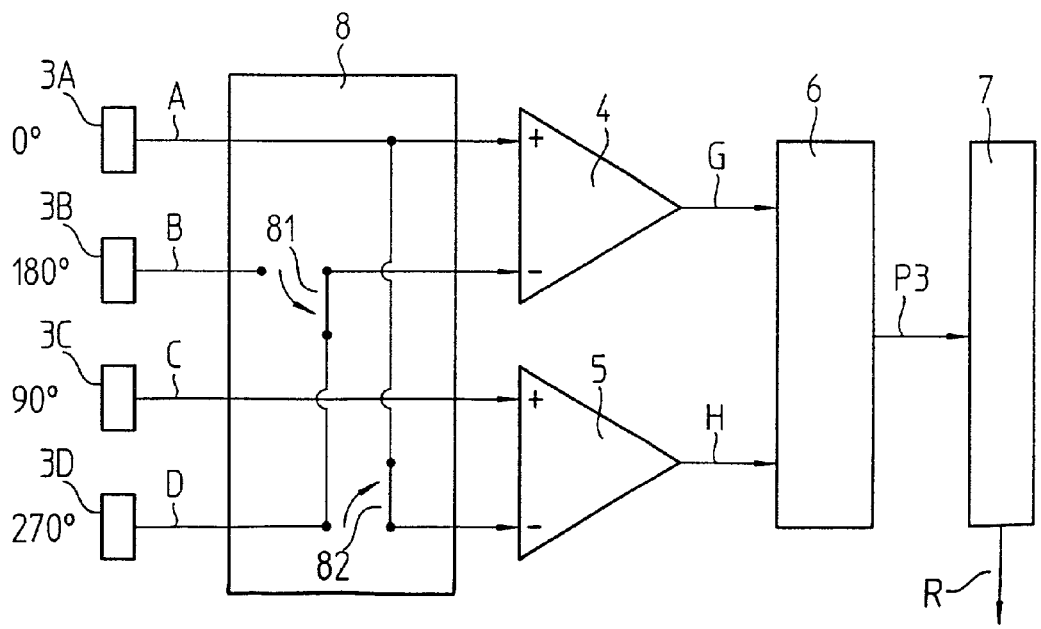
FIG. 2b shows the further position measuring system of FIG. 2a in a second control state.

A second exemplary embodiment is represented in FIGS. 2a and 2b. FIG. 2a shows the position measuring system during normal measuring operations, the same as in accordance with FIG. 1a. The switches 81, 82 are used to supply the scanning signals A and D in a second state to the first differential amplifier 4, so that the differential signal A−D=G lies at its output, and to supply the scanning signals C and A to the second differential amplifier 5, so that the differential signal C−A=H lies at its output. In this state the interpolation unit 6 forms a second absolute measured position value P2' within a period of the periodic differential signals G and H in accordance with the equation P2'=arctan G/H. This second measured position value is the synthetically generated measured position value P2', which is generated in accordance with a linkage rule of the scanning signals A, B, C, D which differs from the actual measuring operation.

Both measured position values P1 and P2' are compared with each other in the comparator device 7 and are tested for the nominal distance. In this second example, under correct operating conditions, P2'=P1−T/8, with T=the signal period of the differential signals G and H. If, for example, a signal period (360°) is divided into 256 equal parts, the comparison P2'=P1−32 must result, if all components which contribute to the generation of the scanning signals A, B, C, D, as well as G and H, operate error-free.

The process of function control preferably takes place during the start-up of the position measuring device, however, it can also take place during the measuring operation, namely during time periods in which no measured position values for positioning a machine element is requested by an external electronic sequential device. The function control in accordance with the present invention preferably takes place within the position measuring system.

With all exemplary embodiments it is possible to use digitized scanning signals for the function control in place of analog scanning signals A to H.

The switch-over device 8 is represented with discrete switches 81 to 84 for explaining the functioning of the invention. In actual operation, this switch-over device 8 in the form of software would be a component of the interpolation unit 6.

The invention is not limited to the photoelectrical position measuring device described, it can also be employed in connection with magnetic, inductive, and well as capacitive, linear, as well as angular, measuring systems. The invention has only been explained by the scanning of a graduation 1. Of course, it can also be employed with multi-track absolute position measuring systems, wherein each track represents a periodic graduation, and the scanning units of the individual graduation tracks are tested in accordance with the present invention.

The foregoing description is provided to illustrate the invention, and is not to be construed as a limitation. Numerous additions, substitutions and other changes can be made to the invention without departing from its scope as set forth in the appended claims.

The invention claimed is:

1. A method for the functional control of a position measuring system, comprising:
   placing a scanning unit at a position with respect to a graduation;
   generating a first scanning signal and a second scanning signal when said scanning unit is at said position;
   forming a first measured position value, P1, in accordance with a first linkage rule that involves said first scanning signal and said second scanning signal;
   forming a second measured position value, P2, in accordance with a second linkage rule that involves said first scanning signal and said second scanning signal, wherein said first linkage rule differs from said second linkage rule;
   comparing said first measured position value, P1, with said second measured position value, P2; and
   generating an error signal as a result of said comparing.

2. A method for the functional control of a position measuring system, comprising:
   placing a scanning unit at a position with respect to a graduation;
   generating a first scanning signal and a second scanning signal when said scanning unit is at said position;
   forming a first measured position value, P1, in accordance with a first linkage rule that involves said first scanning signal and said second scanning signal;
   forming a second measured position value, P2, in accordance with a second linkage rule that involves said first scanning signal and said second scanning signal, wherein said first linkage rule differs from said second linkage rule;
   comparing said first measured position value, P1, with said second measured position value, P2; and
   generating an error signal as a result of said comparing;
   generating a third scanning signal $C=a+\cos\alpha$; and
   generating a fourth scanning signal $D=a-\cos\alpha$;
   wherein said first scanning signal is represented by $A=a+\sin\alpha$ and said second scanning signal is represented by $B=a-\sin\alpha$, wherein a is a d.c. component and $\alpha$ is an angular value that ranges from 0° to 360° and is proportional to an instantaneous position within a graduation period of said graduation and said scanning signals A, B, C and D are each of which phased-shifted by 90' from each other.

3. The method of claim 2, wherein said first measured position value, P1, is formed in accordance with the following first linkage rule:

$P1=\arctan[(A-B)/(C-D)]$.

4. The method of claim 3, wherein said second measured position value, P2, is formed in accordance with the following second linkage rule:

$P2=\arctan[(C-D)/(B-A)]$.

5. The method of claim 3, wherein said second measured position value, P2, is formed in accordance with the following second linkage rule:

$P2=\arctan[(A-D)/(C-A)]$.

6. A position measuring system, comprising:
   a graduation;
   a scanning unit that is positioned with respect to said graduation, wherein said scanning unit comprises a detector system that generates a first scanning signal and a second scanning signal at an instantaneous relative position between said graduation and said scanning unit;
   an evaluation unit that receives said first scanning signal and said second scanning signal, said evaluation unit forms a first measured position value, P1, based on said first scanning signal and said second scanning signal in accordance with a first linkage rule and a second measured position value, P2, based on said first scanning signal and said second scanning signal in accordance with a second linkage rule, wherein said first linkage rule differs from said second linkage rule; and
   a comparator device that receives said first and second measured position values, P1, P2, so as to generate an error signal as a function of said comparator comparing said first and second measured position values, P1, P2.

7. The position measuring system of claim 6, further comprising a switch-over device that applies said first and second scanning signals to said comparator device pursuant to said first linkage and applies said first and second scanning signals to said comparator device pursuant to said second linkage.

8. The position measuring system of claim 6, wherein said evaluation unit comprises an interpolation unit.

9. A position measuring system, comprising:
   a graduation;
   a scanning unit that is positioned with respect to said graduation, wherein said scanning unit comprises a detector system that generates:
     a first scanning signal;
     a second scanning signal at an instantaneous relative position between said graduation and said scanning unit;
     a third scanning signal $C=a+\cos\alpha$;
     a fourth scanning signal $D=a-\cos\alpha$;
     wherein said first scanning signal is represented by $A=a+\sin\alpha$ and said second scanning signal is represented by $B=a-\sin\alpha$, wherein a is a d.c. component and $\alpha$ is an angular value that ranges from 0° to 360° and is proportional to an instantaneous position within a graduation period of said graduation and said scanning signals A, B, C and D are each of which phased-shifted by 90' from each other;
   an evaluation unit that receives said first scanning signal and said second scanning signal, said evaluation unit forms a first measured position value, P1, based on said first scanning signal and said second scanning signal in accordance with a first linkage rule and a second measured position value, P2, based on said first scanning signal and said second scanning signal in accordance with a second linkage rule, wherein said first linkage rule differs from said second linkage rule; and
   a comparator device that receives said first and second measured position values, P1, P2, so as to generate an error signal as a function of said comparator comparing said first and second measured position values, P1, P2.

10. The position measuring system of claim 9, wherein said first measured position value, P1, is formed by said evaluation unit in accordance with the following first linkage rule:

$$P1 = \arctan[(A-B)/(C-D)].$$

11. The position measuring system of claim 10, wherein said second measured position value, P2, is formed by said evaluation unit in accordance with the following second linkage rule:

$$P2 = \arctan[(A-D)/(C-A)].$$

12. The position measuring system of claim 10, wherein said second measured position value, P2, is formed by said evaluation unit in accordance with the following second linkage rule:

$$P2 = \arctan[(C-D)/(B-A)].$$

* * * * *

UNITED STATES PATENT AND TRADEMARK OFFICE
CERTIFICATE OF CORRECTION

PATENT NO.         : 7,031,031 B1
APPLICATION NO. : 10/008371
DATED              : April 18, 2006
INVENTOR(S)        : Erich Strasser It is certified that error appears in the above-identified patent and that said Letters Patent is hereby corrected as shown below:

In the Claims

Column 5, in claim 2, line 58, before "from each other." delete "90'" and substitute --90°-- in its place.

Column 6, in claim 9, line 54, before "from each other;" delete "90'" and substitute --90°-- in its place.

Signed and Sealed this

Twenty-seventh Day of March, 2007

JON W. DUDAS
*Director of the United States Patent and Trademark Office*